United States Patent Office 2,909,466
Patented Oct. 20, 1959

2,909,466

STABLE SOLUTIONS OF OXYTETRACYCLINE SALTS

Horst Neumann, Bingen, and Paul Viehmann and Hans Hugo Hübner, Ingelheim, Germany, assignors, by mesne assignments, to Chas. Pfizer & Co., Inc., Brooklyn, N.Y., a corporation of Delaware No Drawing. Application May 23, 1957
Serial No. 661,033

Claims priority, application Germany May 29, 1956

9 Claims. (Cl. 167—65)

This invention relates to stable solutions of oxytetracycline salts, and more particularly to solutions of oxytetracycline salts in lower alkyl alcohol esters of lactic acid.

Oxytetracycline is known to be a powerful antibiotic agent which is highly effective against rickettsiae, certain viruses, and a number of gram-negative and gram-positive cocci and bacilli; see Goodman and Gilman, "The Pharmacological Basis of Therapeutics," 2nd edition (1956), pages 1378–1392.

For therapeutic purposes, oxytetracycline is administered parenterally and topically in the form of a solution of an oxytetracycline salt, usually oxytetracycline hydrochloride (Terramycin hydrochloride), in a suitable solvent.

It is known that oxytetracycline salts are soluble in a whole series of solvents. For example, oxytetracycline hydrochloride exhibits the following solubilities in the indicated solvents:

| Solvent: | Solubility, mg./cc. |
|---|---|
| Absolute ethanol | 12 |
| 95% ethanol | 33 |
| Methanol | 30 |
| Absolute acetone | 2.5 |
| 90% acetone | 53 |
| Propylene glycol | 54 |
| Butanol | 3.3 |
| Dioxan | 5.3 |
| Acetic acid | 300 |
| Water | 1000 |

It is further well known that oxytetracycline salts hydrolyze in aqueous solution, whereby free oxytetracycline partially precipitates out, and that the aqueous solution decomposes and discolors upon standing for a few days. Moreover, the instability of solutions of oxytetracycline compounds, in general, increases with pH and temperature (Goodman and Gilman, supra, page 1379). In particular, the stability of aqueous oxytetracycline hydrochloride solutions decreases rapidly above a pH of 2 and with increasing temperatures; consequently, the stability of aqueous oxytetracycline hydrochloride solutions depends largely upon the pH-value and on the temperature. For example, an aqueous solution of oxytetracycline hydrochloride at room temperature and at a pH-value of 2.5 begins to discolor and oxytetracycline crystals begin to precipitate out after 5 to 7 days of standing. For this reason, oxytetracycline hydrochloride, and for that matter all of the oxytetracycline salts, intended for use in parenterial or topical therapeutic administration are stored separately from the solvent, and the antibiotic is not added to the solvent until just prior to its administration.

Attempts to produce solutions of oxytetracycline salts which are stable over long periods of time and which, at the same time, are safe for therapeutic administration have been made by prior workers in the art, but such attempts have always failed because the solutions were not stable or, if sufficiently stable, they contained an insufficient amount of oxytetracycline salt, or because the solvent which did produce stable solutions raised considerable doubts with respect to its pharmacological properties.

It is an object of the present invention to provide stable solutions of oxytetracycline salts which contain a sufficient amount of the antibotic for effective therapeutic administration.

Another object of the present invention is to provide a stable solution of oxytetracycline salts wherein the solvent has no objectionable pharmacological properties.

Other objects and advantages of the present invention will become apparent as the description proceeds.

The above-indicated objects and advantages are achieved if a lower alkyl alcohol ester of lactic acid is used as the solvent for the oxytetracycline salt.

The superior stability of oxytetracycline salt solutions prepared with a lower alkyl alcohol ester of lactic acid as a solvent in accordance with the present invention, as compared to solutions prepared with other solvents is readily demonstrated by the following comparison:

(1) An unsaturated solution of oxytetracycline hydrochloride in water showed a substantial decrease in activity after standing at room temperature for 5 to 7 days, and after 5 additional days the solution turned brownish-black and opaque.

(2) An unsaturated solution of oxytetracycline hydrochloride in propylene glycol not only showed a substantial decrease of activity after standing for 48 hours at 4° C., but also a distinct discoloration.

(3) A saturated solution of 8.1 gm. oxytetracycline hydrochloride in 100 cc. lactic acid ethyl ester retained its full activity and did not discolor after standing at room temperature for about three months.

(4) 3 gm. oxytetracycline tartrate (M.P. 188–189° C., decomp.) are dissolved in 100 cc. methyl lactate by shaking. This solution retains its full activity after standing at room temperature for several months.

(5) 4 gm. oxytetracycline benzoate (M.P. 189–190° C., decomp.) are dissolved in 100 cc. methyl lactate by shaking during several hours. This solution retains its full activity after standing at room temperature for several months.

(6) 4 gm. oxytetracycline salicylate (M.P. 178–179° C., decomp.) are dissolved in 100 cc. methyl lactate by shaking during several hours. This solution retains its full activity after standing at room temperature for several months.

Oxytetracycline salts are usually administered parenterally and topically in the form of solutions containing about 5 mg. of antibiotic per milliliter; see Goodman and Gilman, supra, pages 1384–1385. Thus, while solutions of oxytetracycline salts containing a therapeutically sufficiently active amount of antibiotic in solvents heretofore used are unstable, the present invention provides a solvent which forms stable solutions of oxytetracycline salts containing more than a sufficient amount of antibiotic.

The solubility of oxytetracycline hydrochloride in methyl lactate is 140 mg./cc. and in ethyl lactate 81 mg./cc.

The stable solutions of oxytetracycline salts in lower alkyl alcohol esters of lactic acid produced in accordance with the present invention may be employed for many different purposes. For example, they may not only be administered parenterally and topically, but also orally.

There are no pharmacological objections against the use of lower alkyl esters of lactic acid as the solvent for oxytetracycline salts. The toxicity of the esters is low and no detrimental effect has been observed even after prolonged use. While it is self-evident that only the lactic acid ethyl ester is suitable for the preparation of oxytetracycline salt solutions intended for internal administration, both the lactic acid methyl ester and ethyl ester may be interchangeably used for the preparation of oxytetracycline salt solutions intended for topical administration.

While we have illustrated certain specific examples of our invention, it will be readily apparent to others skilled in the art that the present invention is not limited to these specific examples and that various changes and modifications may be made without departing from the spirit of the invention or the scope of the appended claims.

We claim:

1. A stable pharmaceutical solution consisting of at least about 5 mg. oxytetracycline acid salts per ml. of solution, the solvent phase being a lower alkanol ester of lactic acid selected from the group consisting of methyl lactate and ethyl lactate.

2. A stable pharmaceutical solution consisting of at least about 5 mg. oxytetracycline hydrochloride per ml. of solution, the solvent phase being a lower alkanol ester of lactic acid selected from the group consisting of methyl lactate and ethyl lactate.

3. A stable pharmaceutical solution of claim 1 wherein the lower alkanol acid ester is methyl lactate.

4. A stable pharmaceutical solution of claim 1 wherein the lactic acid ester is ethyl lactate.

5. A stable pharmaceutical solution of claim 2 wherein the lower alkanol lactic acid ester is methyl lactate.

6. A stable pharmaceutical solution of claim 2 wherein the lower alkanol lactic acid ester is ethyl lactate.

7. A stable pharmaceutical solution consisting of oxytetracycline tartrate in methyl lactate, the proportion of antibiotic being equivalent to at least about 5 mg./ml. of solution when the antibiotic is calculated as oxytetracycline hydrochloride.

8. A stable pharmaceutical solution consisting of oxytetracycline benzoate in methyl lactate, the proportion of antibiotic being equivalent to at least 5 mg./ml. of solution when the antibiotic is calculated as oxytetracycline hydrochloride.

9. A stable pharmaceutical solution consisting of oxytetracycline salicylate in methyl lactate, the proportion of antibiotic being equivalent to at least 5 mg./ml. of solution when the antibiotic is calculated as oxytetracycline hydrochloride.

References Cited in the file of this patent

UNITED STATES PATENTS 2,803,657    Ritter    Aug. 20, 1957

FOREIGN PATENTS 201,633    Australia    Apr. 28, 1955

OTHER REFERENCES

Peter J. Weiss et al.: Antibiotics and Chemotherapy, vol. 7, No. 7, pp. 374–377, July 1957.